(12) United States Patent
Cummings, III

(10) Patent No.: US 9,417,044 B1
(45) Date of Patent: Aug. 16, 2016

(54) EXPLOSIVES STORAGE SYSTEM

(71) Applicant: The United States of America, as represented by the Secretary of the Navy, Washington, DC (US)

(72) Inventor: Deward L. Cummings, III, Niceville, FL (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 14/963,016

(22) Filed: Dec. 8, 2015

Related U.S. Application Data

(62) Division of application No. 14/169,587, filed on Jan. 31, 2014, now Pat. No. 9,234,732.

(60) Provisional application No. 61/760,546, filed on Feb. 4, 2013.

(51) Int. Cl.
| | | |
|---|---|---|
| *F42B 33/00* | (2006.01) | |
| *F42B 39/00* | (2006.01) | |
| *B29C 65/00* | (2006.01) | |
| *B29K 621/00* | (2006.01) | |
| *B29L 31/00* | (2006.01) | |

(52) U.S. Cl.
CPC ............. *F42B 39/00* (2013.01); *B29C 66/5221* (2013.01); *B29C 66/72* (2013.01); *B29C 66/7315* (2013.01); *B29K 2621/00* (2013.01); *B29K 2995/0091* (2013.01); *B29L 2031/712* (2013.01)

(58) Field of Classification Search
CPC ..... F42B 39/00; B29C 66/5521; B29C 66/72; B29C 66/7315
USPC .............................................. 86/50
See application file for complete search history.

(56) References Cited

U.S. PATENT DOCUMENTS

| | | |
|---|---|---|
| 1,664,899 A | 4/1928 | Ries |
| 3,739,731 A | 6/1973 | Tabor |
| 3,786,956 A | 1/1974 | Tabor |
| 3,820,435 A | 6/1974 | Rogers et al. |
| 3,820,479 A | 6/1974 | Fylling |
| 4,432,285 A | 2/1984 | Boyars |
| 4,964,469 A | 10/1990 | Smith |
| 6,318,473 B1 | 11/2001 | Bartley |
| 6,581,521 B1 | 6/2003 | Dixon |
| 7,036,418 B2 | 5/2006 | Greenfield |
| 2003/0209133 A1 | 11/2003 | Greenfield |

FOREIGN PATENT DOCUMENTS

CA 2246785 3/2003

*Primary Examiner* — Samir Abdosh
(74) *Attorney, Agent, or Firm* — Naval Postgraduate School; Lisa A. Norris

(57) ABSTRACT

An explosives storage system including a container having an opening extending from a top end of the container along a center axis of the container, a sidewall formed between an outer perimeter of the container and an inner perimeter of the opening, and a base portion formed at a bottom end of the container to enclose a bottom of the opening, the bottom of the opening having a hemispherical shape.

6 Claims, 6 Drawing Sheets ably have been included within the scope of embodiments of the present invention.

EXPLOSIVES STORAGE SYSTEM

CROSS-REFERENCE TO RELATED APPLICATIONS

This application is a divisional application of U.S. patent application Ser. No. 14/169,587 filed Jan. 31, 2014 which further claims the benefit of U.S. Provisional Application No. 61/760,546, filed Feb. 4, 2013, both of which are hereby incorporated in their entirety by reference and the benefits of each is hereby claimed.

BACKGROUND OF THE INVENTION

1. Field of the Invention

The present invention relates generally to a container with a lid. More particularly, the invention relates to a system for storing explosives.

2. Description of the Related Art

Unexploded and abandoned ordnance, more broadly known as Explosive Remnants of War (ERW), is a global problem with a broad range of contributing factors. ERW can be an issue in any country or region in which an armed conflict has occurred on its soil.

Improvised containers do not necessarily provide adequate protection to the populace from ERW, nor do they protect the ERW from further deterioration from the elements. On the other hand, military grade storage devices and facilities can be expensive and are not feasible, especially in developing countries.

SUMMARY OF THE INVENTION

In accordance with one embodiment, an explosives storage system is described including: a substantially cylindrical container having an opening extending from a top end of the container along a central axis of the container, a sidewall formed between an outer perimeter of the container and an inner perimeter of the opening, and a base portion formed at a bottom end of the container to enclose a bottom of the opening, the bottom of the opening having a hemispherical shape; and a lid removably disposed on the top end of the container having a through-hole aligned substantially over the opening of the container.

In accordance with another embodiment, a method for manufacturing an explosives storage container is described, the method including: stacking a plurality of tires one on top of another; filling the plurality of tires with a cement and fiber mixture to form a cylindrical sidewall of the container surrounding a central opening; and creating a bottom layer of the container with the cement and fiber mixture, the bottom layer having a hemispherical shape on an inner side that forms a hemispherical termination of the opening.

Embodiments in accordance with the invention are best understood by reference to the following detailed description when read in conjunction with the accompanying drawings.

Embodiments in accordance with the present invention are further described herein with reference to the drawings.

DETAILED DESCRIPTION OF THE INVENTION

A system that provides safe and secure storage of explosives is described herein. According to the embodiments of the present disclosure, the system for storing explosives is scalable and may be constructed using readily available materials at little to no cost. The system may also provide a suitable level of security to prevent theft of the stored explosives. As used herein, the term "explosives" refers to any device that may explode or detonate, such as bombs, improvised explosive devices (IEDs), or ERW.

In an event of unintended detonation of the explosives, the system should stop all ordnance-produced primary fragmentation (i.e., shrapnel from the ordnance itself), while eliminating or creating minimal secondary fragmentation from the storage system itself. Accordingly, the storage system described according to the embodiments of the present disclosure is directed to a thick, reinforced structure, in which the explosion is vented out the top of the structure. Thus, substantial explosive force is directed upward and away from surrounding personnel, while providing a way to contain the fragmentation within the structure.

A person having ordinary skill in the art would understand that explosive reactions will exploit any weakness in any material by taking a path of least resistance. Most blast protection and mitigation structures overcome this limitation by using very thick and very strong building materials. However, in keeping with the spirit of the embodiments of the present invention, low cost, abundantly available materials are utilized instead.

Accordingly, a cylindrical structure is utilized as the container and a hemispherical shape at the internal base of the container allows for the force from the explosion to take the path of least resistance, up and out, without having to turn around in any corners. That is, the inside of the container has substantially no corners.

In this way the explosive storage system is adapted to redirect the thermal effects and blast overpressure wave away from the population and mitigate its effects to a K-Factor of 24. A K-Factor of 24 or K-24 (31 feet or 9 meters) is the minimum distance allowed between an individual and a one pound (1 lb.) TNT equivalent explosive detonation without receiving life threatening or disabling injuries, such as lung or ear drum ruptures. Accordingly, a system for minimizing or stopping the ordnance-produced primary and secondary fragmentation is described by implementing a simple, scalable, design and construction methodology that utilizes readily available, sustainable, and reused materials.

Figure 1:
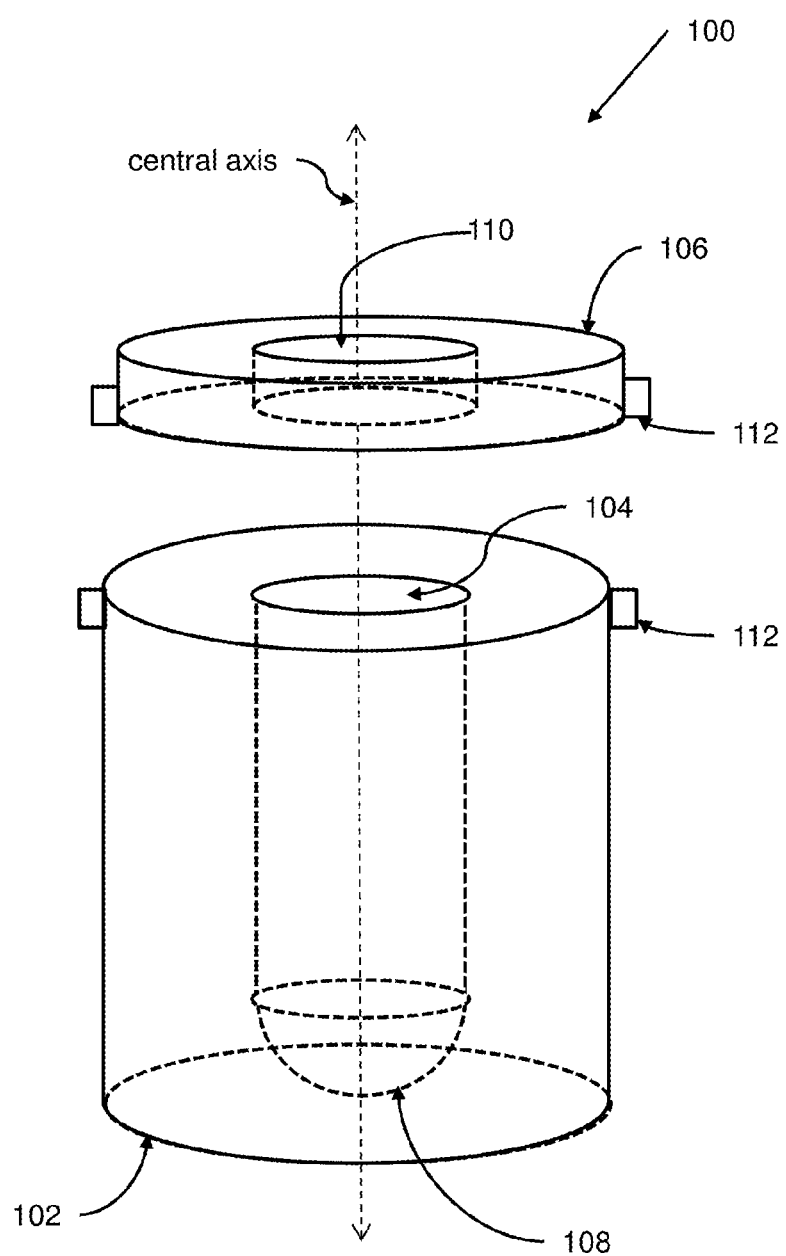
FIG. 1 illustrates a perspective view of an exemplary explosives storage system in accordance with one embodiment.

FIG. 1 shows a perspective view of an explosives storage system 100 which includes a container 102 and a lid 106. Container 102 has a cylindrical shaped body and has a round opening 104 at a top portion of container 102 that extends downward along a central axis of container 102. In the present embodiment, the bottom of opening 104 terminates in a hemispherical shape 108 in order to minimize corners or edges. Accordingly, if ordnance detonated inside opening 104 of container 102, fragmentation from the explosive will take the path of least resistance and exit upward, and out of container 102.

In one embodiment, container 102 is covered with lid 106. Lid 106 has a through-hole 110, such as a round opening. In one embodiment, lid 106 is sized to be placed on top of container 102 and to cover the top of container 102 such that through-hole 110 is aligned over at least a portion of opening 104. In some embodiments, latch devices 112 are formed in or attached to container 102 and lid 106 to enable explosives storage system 100 to be secured, such as by locking.

Figure 2A:
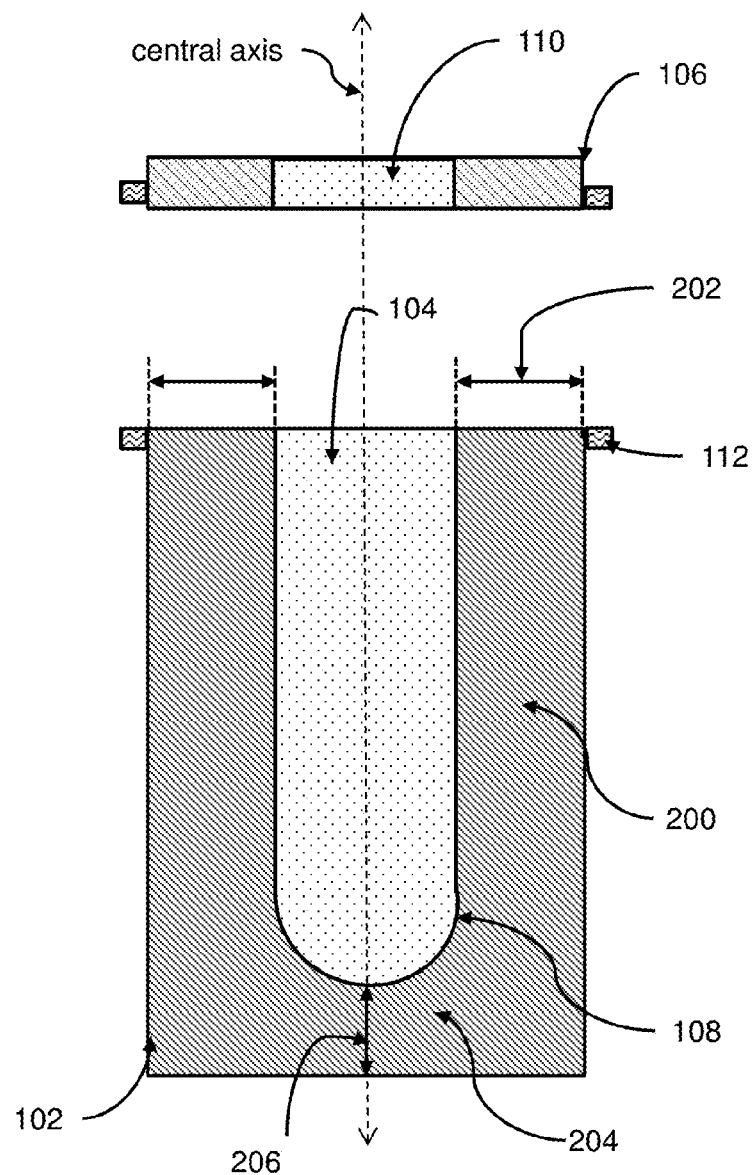
FIG. 2A illustrates a side sectional view of the explosives storage system of FIG. 1 in accordance with one embodiment.

FIG. 2A illustrates a side sectional view of explosives storage system 100 showing container 102 having opening 104 with hemispherical shape 108, and lid 106. In one embodiment container 102 has a continuous sidewall 200 made of, for example, cement with reinforcement fibers, and having a thickness 202 that is suitable to withstand an explosive blast. Container 102 further has a base portion 204, made of, for example, cement with reinforcement fibers, and having a suitable thickness 206. In one embodiment, sidewall 200 surrounds opening 104 to form a cylindrical cavity shape with a substantially smooth inner wall. Base portion 204 is formed in a hemispherical shape so that as the inner perimeter wall formed by sidewall 200 terminates in base portion 204, the bottom of opening 104 is terminated in hemispherical shape 108. In one embodiment, the hemispherical shape of the inner side of base portion 204 is substantially smooth. In some embodiments, latch devices 112 can be formed in or attached to container 102 and lid 106 to allow lid 106 to be secured to container 102.

Figure 2B:
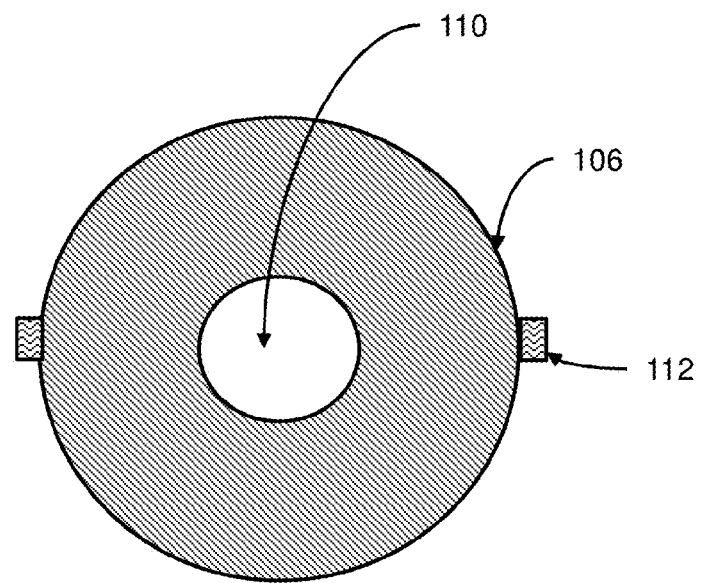
FIG. 2B illustrates a top view of the explosives storage system of FIG. 1 in accordance with one embodiment.

FIG. 2B illustrates a top view of explosives storage system 100 showing container 102 covered with lid 106 in accordance with one embodiment. As earlier described, in one embodiment, lid 106 has a through-hole 110 (i.e., an opening) that is approximately the same size as opening 104 of container 102 to allow venting from container 102 when explosives detonate. Accordingly, an explosive device may be placed in container 102 and covered with lid 106 to contain any fragmentation from the blast.

Figure 2C:
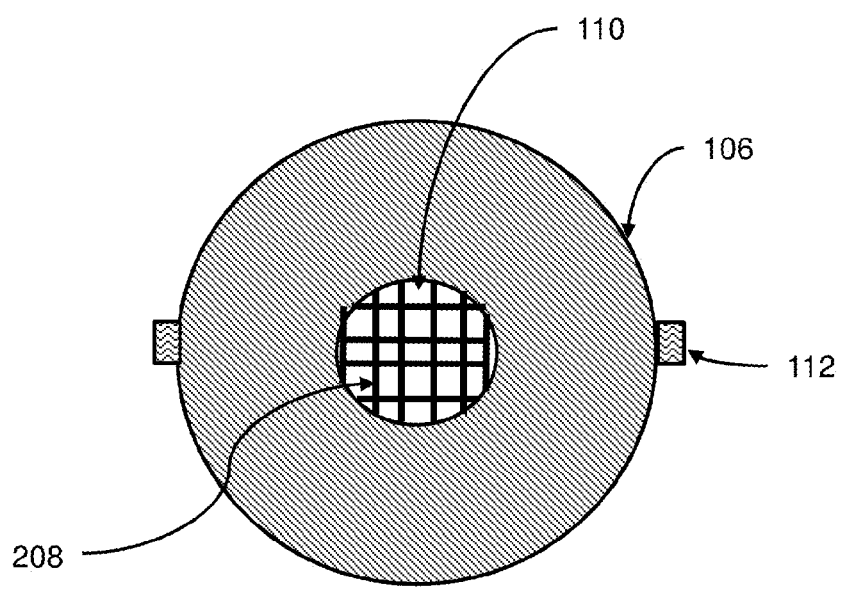
FIG. 2C illustrates a top view of the explosives storage system of FIG. 1 with a reinforcing structure in accordance with another embodiment.

FIG. 2C illustrates a top view of explosives storage system 100 showing container 102 covered with lid 106 in which through-hole 110 is covered with a reinforcing structure 208, such as a lattice of metal rods or webbing, in accordance with one embodiment. Reinforcing structure 208 serves to prevent entrance of outside elements, such as people, animals, or debris, and yet is spaced and/or flexible enough to allow a detonation force to escape upward from container 102. In some embodiments, see for example, FIG. 7, a flexible covering such as a tarp material can be placed over through-hole 110 to prevent entrance of elements such as water or debris.

As earlier described, in one embodiment, lid 106 has through-hole 110 (i.e., an opening) that is approximately the same size as opening 104 of container 102 to allow venting from container 102 when explosives detonate. Accordingly, an explosive device may be placed in container 102 and covered with lid 106 to contain any fragmentation from a blast. In one embodiment, latch devices 112 when secured assist in containing a detonation in container 102.

In some embodiments, container 102 may be made of a thick metal and/or reinforced building material in which an explosion is vented out of the top of container 102. In various embodiments in accordance with the invention, container 102 can be made of various materials that may be abundantly available and low cost. In some embodiments, container 102 is first reinforced with fiber material. In some embodiments, lid 106 is made of materials similar to container 102. In alternate embodiments, lid 106 can be made of materials different from container 102.

According to an example embodiment, container 102 can be made of a mixture of cement and fiber reinforcement material. In more detail, a ratio of one-half portion (e.g., one-half of a bucket) of cement is added to one portion of fiber and dry mixed together, according to an example embodiment. Then one portion of soil is added to the cement and fiber mixture, and further dry mixed together. Next, one-half portion of sand is added to the cement, soil, and fiber mixture, and dry mixed again. Once the dry mixing is performing, the fibers are completely coated or "dusted" in the binding matrix, and water is gradually added in small amounts until the desired consistency of the mixture is obtained.

In some embodiments, the fiber can be one or more of natural fibers and/or raw fibers such as, by way of example and not of limitation, S bagasse (sugar cane pulp), phormium (New Zealand flax), Indian hemp (dogbane), papaya, reed fiber, ramie (China grass cloth), sisal (agave), coir, palm fiber, bamboo fiber, umbrella plant, milkweed, pina, abaca, cotton, kapok, bast fibers, nettles, esparto, bowstring hemp, jute, kenaf, henequen, hemp, flex, hoovine, elephant grass, yucca, water reed, plantain, musamba, wood fiber (kraft pulp), maguey, lechuguilla, banana leaf, and guaney.

Figure 3A:
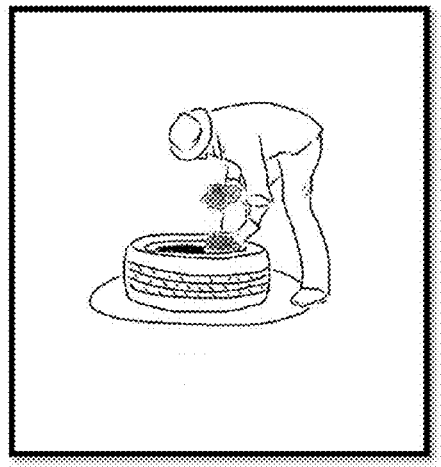
FIGS. 3A-3C illustrate a method of construction of an exemplary container for the explosives storage system of FIG. 1 by utilizing a tire as reinforcement material in accordance with one embodiment.
Figure 3B:
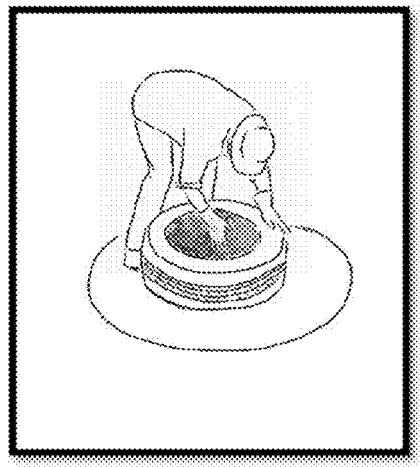
Figure 3C:
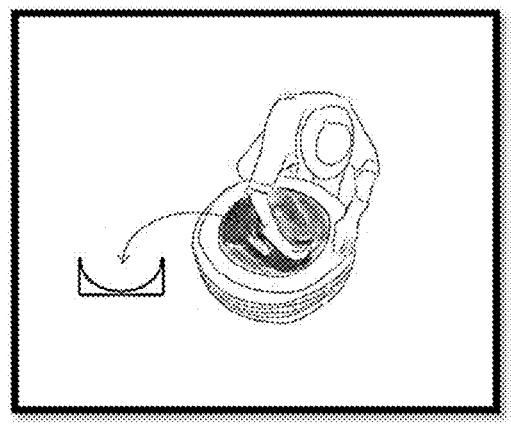
Figure 4:
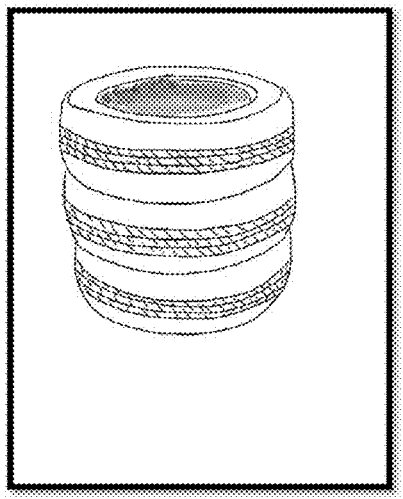
FIG. 4 illustrates three tires stacked on top of one another to be used for reinforcement in accordance with one embodiment.

In some embodiments, tires (e.g., truck tires) may be utilized as reinforcements for the container. FIGS. 3A-3B show the tire being packed with the mixture created as described above. In some embodiments, the tires can be stacked, one on top of another, for example, up to three or four tires high, as shown in FIG. 4. A center portion of the packed tires can have an opening and the hemispherical bottom portion can be formed as shown in FIG. 3C.

Figure 5:
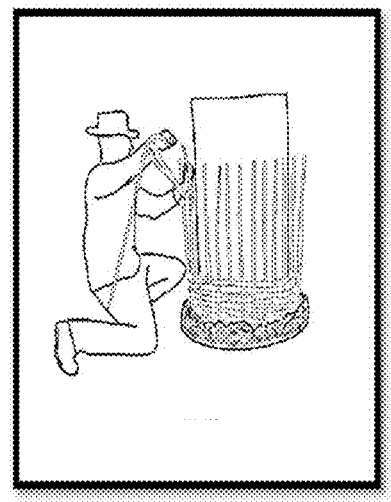
FIGS. 5-6 illustrate a method of construction of an exemplary container for the explosives storage system of FIG. 1 using basket-like woven reinforcement in accordance with one embodiment.

Alternatively, in some embodiments, vertical stabilizers can be utilized and woven in a basket-like manner with horizontal stabilizers to create a framework, or reinforcement for the container. For example, substantially straight vertical stabilizers such as bamboo can be driven directly into the ground eight to 12" (25.4 cm) as shown in FIG. 5. The vertical and horizontal stabilizers can also be comprised of other abundantly available materials such as plastic bags, sliced open plastic bottles, and sliced tires.

Figure 6:
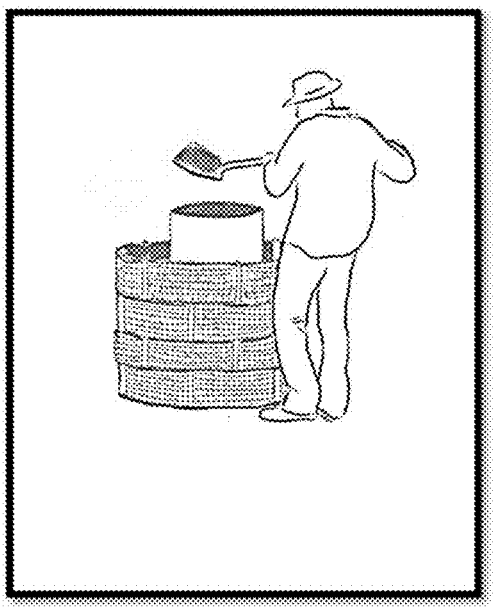

In some embodiments, the base of the container can be made first, and the vertical stabilizers can be driven directly into the outer edges of the base. Once the vertical stabilizers are set in place, horizontal stabilizer material is woven into the vertical stabilizers to form a basket-like structure as shown in FIG. 5. The cement and fiber mixture is used to fill in the space between the woven basket and the inner diameter to create the cylindrical sidewalls of the container as shown in FIG. 6.

Once the cement and fiber mixture is cured, the inner diameter mold can be removed and the internal hemispheric bottom portion is created. As described earlier, the hemispheric bottom portion redirects the thermal effects and blast wave of a detonation vertically upwards.

According to an embodiment, lid 106 for container 102 is constructed of approximately 3" of the cement and fiber mixture. Lid 106 has a through-hole 110 at the center that is approximately the same size as opening 104 of container 102, i.e., the inner diameter of through-hole 110 is approximately 20"-24" (50.8 cm) to allow the detonation to vent directly up and out of container 102, and away from the surrounding area.

Figure 7:
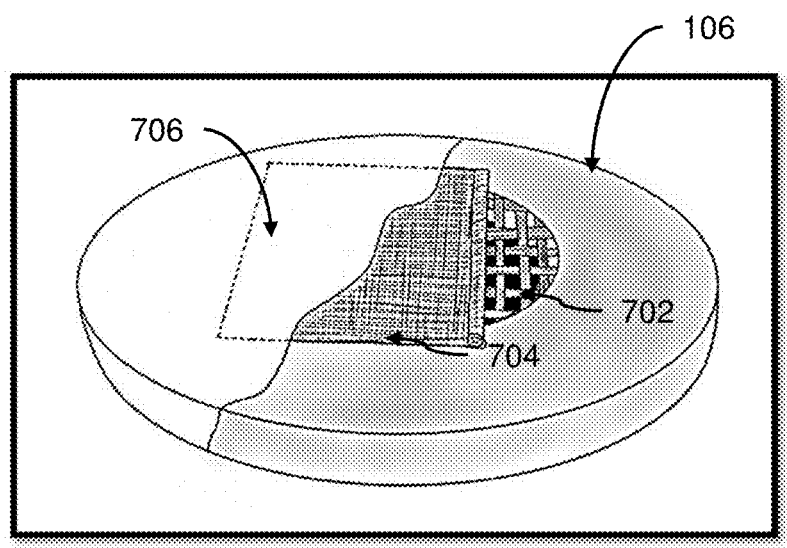
FIG. 7 illustrates an exemplary lid of the explosive storage system of FIG. 1 including a reinforcing structure, flexible covering, and a thin external finish in accordance with one embodiment.

In one embodiment, once the cement and fiber mixture of container 102 and lid 106 cures, an external finish is applied to the surface to further reduce the effects of a detonation, and allow for painting the surface to protect container 102 and lid 106 from elements. A thin external finish can also applied covering the venting hole of the lid as shown in FIG. 7. As further shown in FIG. 7, in one embodiment, lid 106 can include a reinforcing structure 702, a flexible covering, 704, and a thin finish 706.

Although various materials and fibers have been described in fabricating exemplary embodiments in accordance with the invention other materials can also be used. Naturally occurring, discontinuous short cellulose fibers are widely used in Fiber Reinforced Concrete (FRC) all over the world. Termed natural fiber reinforced concrete (NFRC), its applications are numerous and include modern synthetically reinforced building materials. A myriad of natural reinforcing materials can be obtained at little cost, or for free, as agricultural byproducts using locally available manpower and technical expertise. Fibers, such as hemp and jute, are often used in the manufacture of low fiber content building materials and are typically referred to as unprocessed natural fibers (UNF). However, as the fiber content is increased, the material strength increases.

A variety of fiber materials other than steel, glass, or natural fibers have been developed and used to reinforce building materials, most commonly concrete. These fibers are categorized as synthetic fibers and are used in cement products generally termed SNFRC. Some of these fibers have little reported research while others, such as polypropylene, are often found in commercial applications and have been tested extensively. Synthetic fibers can increase the concrete composite's ductility and impact resistance significantly. Many synthetic materials can be found throughout the world as waste, such as plastic bags, water bottles, and discarded polypropylene rope that has reached the end of its service life. Any of these or other man-made material with acceptable tensile strength could be used as a substitute or addition to synthetic fibers. Variations of synthetic materials might be available as waste products such as any length of discarded rope, Polyethylene terephthalate (PET) from plastic bottles, or any readily shred-able plastic similar to PET or Polypropylene (PP).

Accordingly, this disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method for manufacturing an explosives storage container, the method comprising:
    stacking a plurality of tires one on top of another;
    filling the plurality of tires with a cement and fiber mixture to form a sidewall of the container; and
    creating a bottom layer of the container with the cement and fiber mixture, the bottom layer having a hemispherical shape on an inner side.

2. The method of claim 1, further comprising:
    disposing a lid over the container, the lid having a through-hole aligned substantially over an opening formed by the sidewalls of the container.

3. The method of claim 1, wherein the lid is made of the cement and fiber mixture.

4. The method of claim 3, wherein the fiber is selected from the group consisting one or more of: S bagasse (sugar cane pulp), phormium (New Zealand flax), Indian hemp (dogbane), papaya, reed fiber, ramie (China grass cloth), sisal (agave), coir, palm fiber, bamboo fiber, umbrella plant, milkweed, pina, abaca, cotton, kapok, bast fibers, nettles, esparto, bowstring hemp, jute, kenaf, henequen, hemp, flex, hoovine, elephant grass, yucca, water reed, plantain, musamba, wood fiber (kraft pulp), maguey, lechuguilla, banana leaf, and guaney.

5. The method of claim 4, further comprising vertical stabilizers and horizontal stabilizers, woven together to reinforce the sidewalls of the container.

6. The method of claim 5, wherein the vertical stabilizers and the horizontal stabilizers are made of material selected from the group consisting one or more of: bamboo, plastic bags, strips of sliced plastic bottles, and strips of sliced tires.

* * * * *